(12) United States Patent
Liang et al.

(10) Patent No.: US 11,894,567 B1
(45) Date of Patent: Feb. 6, 2024

(54) END COVER ASSEMBLY, ENERGY STORAGE DEVICE AND ELECTRICAL EQUIPMENT

(71) Applicants: SHENZHEN HITHIUM ENERGY STORAGE CONTROL TECHNOLOGY CO. LTD., Guangdong (CN); XIAMEN HITHIUM ENERGY STORAGE TECHNOLOGY CO., LTD., Fujian (CN)

(72) Inventors: Jinyun Liang, Fujian (CN); Liangliang Zhang, Fujian (CN); Wancai Zhang, Fujian (CN); Feng Wang, Fujian (CN)

(73) Assignees: SHENZHEN HITHIUM ENERGY STORAGE CONTROL TECHNOLOGY CO. LTD., Guangdong (CN); XIAMEN HITHIUM ENERGY STORAGE TECHNOLOGY CO., LTD., Fujian (CN)

( * ) Notice: Subject to any disclaimer, the term of this patent is extended or adjusted under 35 U.S.C. 154(b) by 0 days.

(21) Appl. No.: 18/216,249

(22) Filed: Jun. 29, 2023

(51) Int. Cl.
*H01M 50/15* (2021.01)
*H01M 50/184* (2021.01)
(Continued)

(52) U.S. Cl.
CPC ......... *H01M 50/15* (2021.01); *H01M 50/184* (2021.01); *H01M 50/188* (2021.01);
(Continued)

(58) Field of Classification Search
CPC ............... H01M 50/15; H01M 50/184; H01M 50/188; H01M 50/528; H01M 50/55; H01M 10/02
See application file for complete search history.

(56) References Cited

FOREIGN PATENT DOCUMENTS

| CN | 207233790 U | * | 4/2001 | ........ H01M 10/0413 |
|---|---|---|---|---|
| CN | 103178231 A | | 6/2013 | |

(Continued)

OTHER PUBLICATIONS

English translation of WO2020063584A1 (Year: 2020).*
(Continued)

*Primary Examiner* — Ula C Ruddock
*Assistant Examiner* — Sarika Gupta
(74) *Attorney, Agent, or Firm* — Scully, Scott, Murphy & Presser, P.C.

(57) ABSTRACT

The present disclosure discloses an end cover assembly, an energy storage device and electrical equipment. The end cover assembly includes an end cover provided with an outlet hole penetrating therethrough, an electrode terminal arranged on one side of the end cover, a sealing member including a first sealing portion and a plastic member including a first plastic portion. A projection, on the end cover of the electrode terminal along a thickness direction of the end cover covers the outlet hole, and a first gap surrounding the outlet hole is formed between the electrode terminal and the end cover. The first sealing portion fills one side of the first gap close to the outlet hole. The first plastic portion fills one side of the first gap away from the outlet hole; and a second gap is formed between the first sealing portion and the first plastic portion.

10 Claims, 2 Drawing Sheets

(51) Int. Cl.
*H01M 50/528* (2021.01)
*H01M 50/55* (2021.01)
*H01M 50/188* (2021.01)
*H01M 10/02* (2006.01)

(52) U.S. Cl.
CPC ......... *H01M 50/528* (2021.01); *H01M 50/55* (2021.01); *H01M 10/02* (2013.01)

(56) References Cited

FOREIGN PATENT DOCUMENTS

| | | | |
|---|---|---|---|
| CN | 108365138 A | 8/2018 | |
| CN | 211017132 U | 7/2020 | |
| CN | 115566332 A | 1/2023 | |
| WO | 2020063584 A1 | 4/2020 | |
| WO | WO-2020063584 A1 * | 4/2020 | |

OTHER PUBLICATIONS

English translation of CN207233790U (Year: 2018).*
Notice of First Review Opinion dated Jan. 30, 2023 received in Chinese Patent Application No. CN 202211416056.6.
Notice of Granting Invention Patent Right dated Mar. 23, 2023 received in Chinese Patent Application No. CN 202211416056.6.

* cited by examiner

END COVER ASSEMBLY, ENERGY STORAGE DEVICE AND ELECTRICAL EQUIPMENT

CROSS-REFERENCE TO RELATED APPLICATION

The application claims priority of Chinese patent application CN202211416056.6, filed on Nov. 11, 2022, which is incorporated herein by reference in its entireties.

TECHNICAL FIELD

The present disclosure relates to the technical field of battery assembling, and in particular, to an end cover assembly, an energy storage device and electrical equipment.

BACKGROUND

A power battery is an energy storage device commonly used in the technical field of new energy at present. It is widely used in equipment such as an electric vehicle, has the advantages of energy conservation and environmental protection, and is also a development trend of future new energy.

In related technologies, in order to ensure stability of connection, a sealing member for sealing would be arranged at a gap between an electrode terminal and an end cover in a battery to prevent external stains from entering the battery to cause abnormalities such as pollution and battery short circuit.

However, during assembling of a battery, all components easily press each other. Especially when the sealing member and a plastic member press and contact each other, an extremely high temperature of the plastic member easily burns and damages the sealing member.

SUMMARY

Embodiments of the present disclosure disclose an end cover assembly, an energy storage device and electrical equipment, which can solve the problem in the related technology that a sealing member in a battery is easily burnt and damaged by a plastic member.

In order to achieve the above object, in a first aspect, the present disclosure discloses an end cover assembly, including: an end cover, provided with an outlet hole penetrating therethrough; an electrode terminal, arranged on one side of the end cover, wherein a projection, on the end cover, of the electrode terminal along a thickness direction of the end cover covers the outlet hole, and a first gap surrounding the outlet hole is formed between the electrode terminal and the end cover; a sealing member, including a first sealing portion, wherein the first sealing portion fills one side of the first gap close to the outlet hole; and a plastic member, including a first plastic portion, wherein the first plastic portion fills one side of the first gap away from the outlet hole; and a second gap is formed between the first sealing portion and the first plastic portion.

Optionally, along a radial direction of the electrode terminal, a size of the first gap is D1, and a size of the second gap is D2, and $0.2 \leq D2/D1 \leq 0.3$.

Optionally, along the radial direction of the electrode terminal, $1.1 \text{ mm} < D2 < 1.3 \text{ mm}$.

Optionally, an edge of one side of the first gap close to the outlet hole may be provided with a first protrusion, and first protrusion is connected to the end cover; a second protrusion is arranged in the second gap, and the second protrusion is connected to the end cover and/or the electrode terminal; and the first sealing portion is located between the first protrusion and the second protrusion.

Optionally, along an axial direction of the electrode terminal, a size of the first protrusion is H1, and a size of the second protrusion is H2, wherein $0.1 \text{ mm} < H1 < 0.3 \text{ mm}$, and $0.1 \text{ mm} < H2 < 0.3 \text{ mm}$.

Optionally, wherein the sealing member further includes a second sealing portion; the second sealing portion and the first sealing portion are integrated; and the second sealing portion abuts against an inner surface of the outlet hole.

Optionally, along the thickness direction of the end cover, one end of the second sealing portion away from the first sealing portion is located out of the outlet hole.

Optionally, the plastic member further includes a second plastic portion; the second plastic portion and the first plastic portion are integrated; and the second plastic portion surrounds a peripheral surface of the electrode terminal.

Optionally, a concave portion is formed in a surface of one side of the end cover that faces the electrode terminal, and the outlet hole is formed in a bottom of the concave portion; and projections, on the end cover, of the electrode terminal and the plastic member along the thickness direction of the end cover are located in the concave portion, so that the first gap is formed between the electrode terminal and the bottom of the concave portion.

Optionally, in the thickness direction of the end cover, a ratio of a thickness H3 of the first gap to a depth H4 of the concave portion is: $0.5 \leq H3/H4 \leq 0.8$.

Optionally, the sealing member is of an independent structure, and the sealing member is mounted on the end cover.

In the second aspect, the present disclosure discloses an energy storage device, including: a housing, having an opening at one end thereof; an electrode assembly, accommodated in the housing; and the end cover assembly, wherein the end cover assembly hermetically covers the opening of the housing.

Optionally, further including a connection sheet, wherein the connection sheet is used for electrically connecting the electrode terminal with the electrode assembly; the connection sheet is accommodated in the housing; the connection sheet is provided with a convex portion; the convex portion passes through the outlet hole and is electrically connected with the electrode terminal.

In the third aspect, the present disclosure discloses an electrical equipment, including the energy storage device.

Compared with the prior art, the present disclosure has the beneficial effects below:

In the present disclosure, the end cover assembly is structurally optimized. Specifically, the end cover assembly includes an end cover, provided with an outlet hole penetrating therethrough; an electrode terminal, arranged on one side of the end cover, wherein a projection, on the end cover, of the electrode terminal along a thickness direction of the end cover covers the outlet hole, and a first gap surrounding the outlet hole is formed between the electrode terminal and the end cover; a sealing member, including a first sealing portion which fills one side of the first gap close to the outlet hole; a plastic member, including a first plastic portion, wherein the first plastic portion fills one side of the first gap away from the outlet hole, and a second gap is formed between the first sealing portion and the first plastic portion.

In this way, the formation of the second gap can effectively isolate the sealing member from the plastic member, thereby preventing the sealing member from being burnt and damaged by a high temperature generated by a plastic member that has been just formed, and prolonging a service life of the sealing member.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

NUMERALS IN THE DRAWINGS

Figure 1:
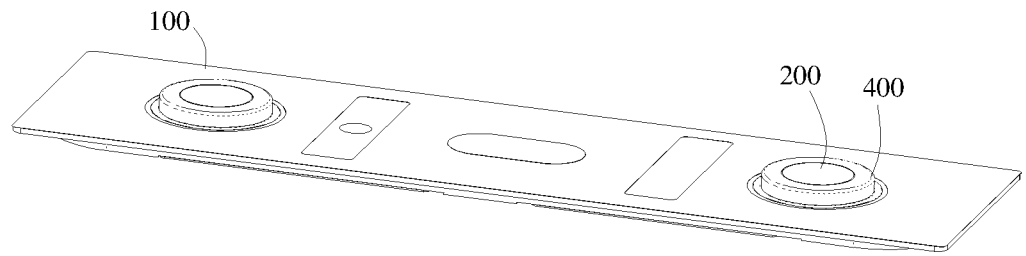
FIG. 1 is a structural diagram of an end cover assembly disclosed by the present disclosure.
Figure 2:
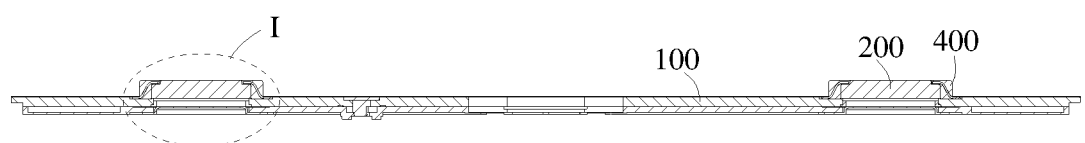
FIG. 2 is a half sectional diagram of an end cover assembly disclosed by the present disclosure.
Figure 3:
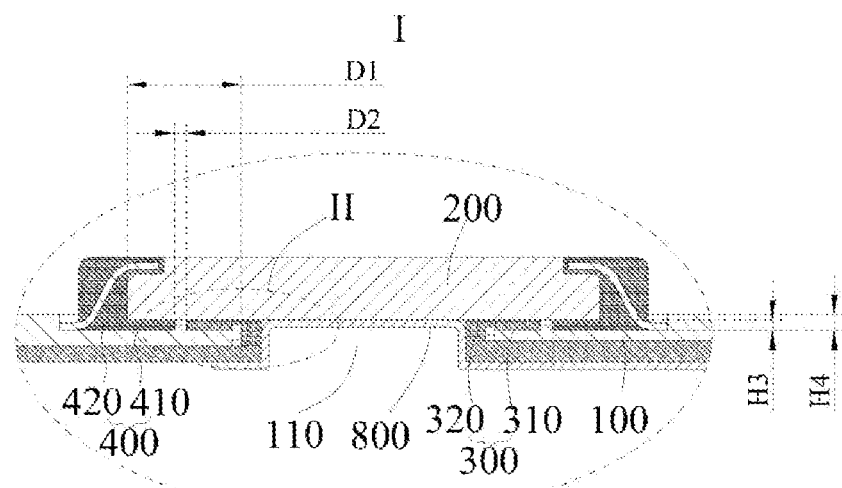
FIG. 3 is an enlarged diagram of a portion I of FIG. 2 disclosed by the present disclosure.
Figure 4:
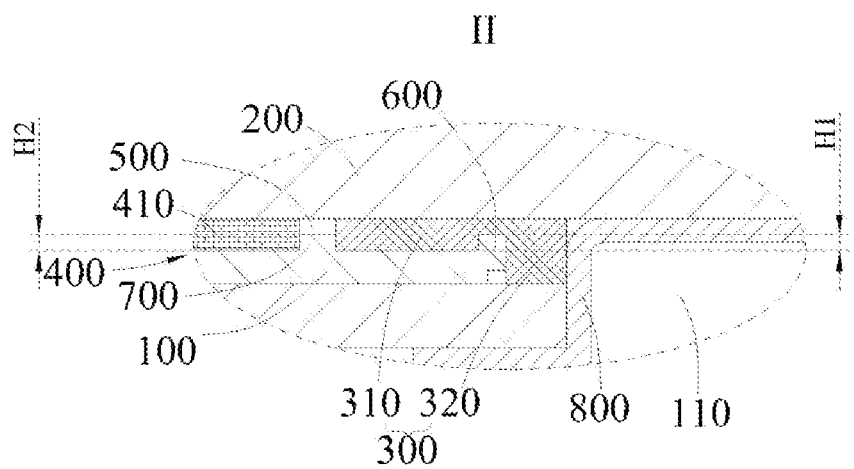
FIG. 4 is a first enlarged diagram of a portion II of FIG. 3 disclosed by the present disclosure.
Figure 5:
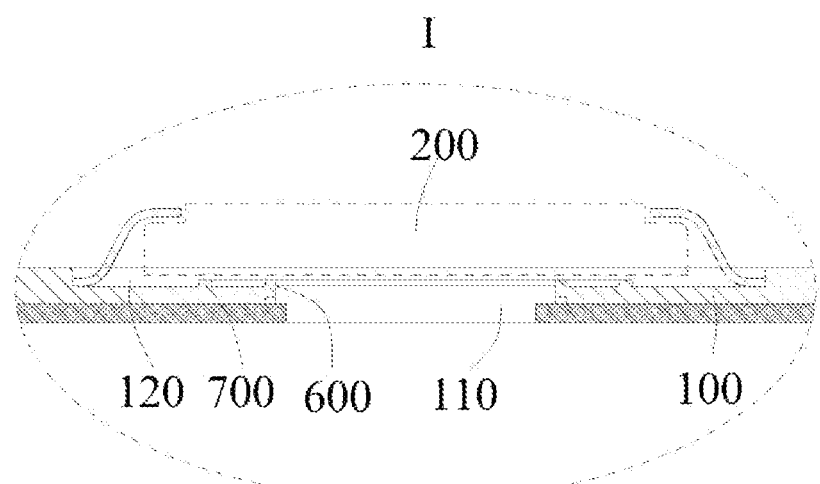
FIG. 5 is a structural diagram in the enlarged diagram of the portion I of FIG. 2 disclosed by the present disclosure, where only an end cover remains.

100: end cover;
110: outlet hole; 120: concave portion;
200: electrode terminal;
300: sealing member;
310: first sealing portion; 320: second sealing portion;
400: plastic member;
410: first plastic portion; 420: second plastic portion;
500: second gap;
600: first protrusion;
700: second protrusion; and
800: connection sheet.

DETAILED DESCRIPTION OF EMBODIMENTS

The accompanying drawings in the embodiment of the present disclosure are combined, The technical scheme in the embodiment of the present disclosure is clearly and completely described, Obviously, the described embodiment is only a part of the embodiment of the utility model, but not all embodiments are based on the embodiment of the utility model, and all other embodiments obtained by ordinary technicians in the field on the premise of not doing creative work belong to the protection range of the utility model.

In the present disclosure, The terms "upper", "lower", "left", "right", "front", "rear", "top", "bottom", "inner", "outer", "middle", "vertical", "horizontal", "transverse", "longitudinal", and the like indicate azimuth or positional relationships based primarily on the azimuth or positional relationships shown in the drawings, Not intended to define the indicated device, element or component must have a particular orientation, or be constructed and operated in a particular orientation.

Furthermore, the above-described partial terms may be used in addition to indicating azimuth or positional relationships. It may also be used to refer to other meanings, such as the term "above" in some cases may also be used to refer to certain dependencies or connectivity. The specific meanings of these terms in the present disclosure will be understood by those of ordinary skill in the art as the case may be.

In addition, the terms "mounted", "disposed", "provided", "connected", "connected", and "socket" are to be construed broadly to mean, for example, a fixed connection, a detachable connection, or an integral construction; It may be a mechanical connection, or an electrical connection; The specific meaning of the above-mentioned terms in the present disclosure will be understood by those of ordinary skill in the art as the case may be, either directly, or indirectly, via an intermediate medium, or internal communication between two devices, elements, or components. The specific meanings of these terms in the present disclosure will be understood by those of ordinary skill in the art as the case may be.

In addition, the terms "first", "second", etc., are used primarily to distinguish different devices, elements or components (the specific type and construction may be the same or different) and are not used to indicate or imply the relative importance or quantity of the indicated device, element or component. Unless otherwise stated, "plurality" means two or more.

In a related technology, in order to ensure stability of connection, an electrode terminal in a battery and an end cover will be connected in an injection manner. At the same time, a sealing member for sealing will be provided. However, during assembling of the battery, the sealing member and a plastic member easily press each other. Furthermore, it still possible that the plastic member that has been just formed may damage the sealing member due to its extremely high temperature. In order to solve this problem, the present disclosure discloses an end cover assembly, which will be described in detail below.

The end cover assembly of the present disclosure may include: an end cover 100, an electrode terminal 200, a sealing member 300 and a plastic member 400. The end cover 100 is a setting base for the end cover assembly. The end cover 100 may be provided with an outlet hole 110 penetrating therethrough, so that a conductive component can transfer electric energy. The electrode terminal 200 may be arranged on one side of the end cover 100, and a projection, on the end cover 100, of the electrode terminal 200 along a thickness direction of the end cover 100 covers the outlet hole 110. A first gap surrounding the outlet hole 110 is formed between the electrode terminal 200 and the end cover 100. The electrode terminal 200 serves as one conductive component in the end cover assembly, and can be connected to an electrode assembly of an energy storage device through a connection sheet 800 below, thereby realizing electrical conduction.

The sealing member 300 is used for achieving sealing. Specifically, the sealing member 300 may include a first sealing portion 310. The first sealing portion 310 fills one side of the first gap close to the outlet hole 110.

The plastic member 400 is used for realizing injection connection between the end cover 100 and the electrode terminal 200 to improve structural stability of the end cover assembly. Specifically, the plastic member 400 may include a first plastic portion 410. The first plastic portion 410 fills one side of the first gap away from the outlet hole 110. A second gap 500 is formed between the first sealing portion 310 and the first plastic portion 410.

In the present disclosure, the first plastic portion 410 and the first sealing portion 310 are spaced apart from each other to form the second gap 500. The formation of the second gap 500 can effectively isolate the sealing member 300 from the plastic member 400, thereby preventing mutual pressing and more importantly preventing the sealing member 300 from being burnt and damaged by a high temperature generated by the plastic member 400 that has been just formed, to prolong a service life of the sealing member 300.

Optionally, the plastic member 400 and the sealing member 300 may be both configured to be annular, to improve the structural stability. Similarly, the first gap and second gap 500 can also be formed as annular band gaps, which will not be described in detail here.

Optionally, the sealing member 300 may be made of silica gel or another material, to ensure a good sealing property.

Optionally, along a radial direction of the electrode terminal 200, a size of the first gap is D1, and a size of the second gap 500 is D2, where $0.2 \leq D2/D1 \leq 0.3$, for example, D2/D1=0.21, 0.25 and 0.29.

In the present disclosure, the second gap 500 with an extremely small size cannot achieve an effect of isolating the plastic member 400 from the sealing member 300, and the second gap 500 with an extremely large size occupies a larger portion of the first gap, which affects a proportion of the plastic member 400 in the first gap, thus affecting an injection connection effect between the end cover 100 and the electrode terminal 200, and affects a proportion of the sealing member 300 in the first gap, thus affecting the sealing property of the sealing member 300. Therefore, a ratio of the first gap to the second gap 500 can be controlled to $0.2 \leq D2/D1 \leq 0.3$ to enable the second gap 500 to guarantee a better isolation effect, without affecting the injection connection performance of the plastic member 400 and the sealing property of the sealing member 300.

Optionally, along the radial direction of the electrode terminal 200, 1.1 mm<D2<1.3 mm, for example, D2=1.11 mm, 1.25 mm and 1.29 mm. In this way, the size of the second gap 500 can be further controlled, so that the second gap can better exert the isolation effect, and the impact on the injection connection performance and the sealing property is avoided.

Optionally, an edge of one side of the first gap close to the outlet hole 110 may be provided with a first protrusion 600. The first protrusion 600 is connected to the end cover 100.

A second protrusion 700 may be arranged in the second gap 500. The second protrusion 700 is connected to the end cover 100 and/or the electrode terminal 200. For example, the second protrusion 700 is connected to the end cover 100, or the second protrusion 700 is connected to the electrode terminal 200, or the end cover 100 and the electrode terminal 200 are both connected with the second protrusion 700.

The first sealing portion 310 is located between the first protrusion 600 and the second protrusion 700.

Based on the arrangement of the second protrusion 700, the sealing member 300 and the plastic member 400 can be isolated more effectively, which further ensures the stability of the formed second gap 500 and ensures the service life of the sealing member 300/the second protrusion 700 may cooperate with the first protrusion 600 to better achieve limitation to the sealing member 300 and prevent the sealing member 300 from failing in sealing due to an abnormal movement.

Optionally, if the first protrusion 600 and the second protrusion 700 are too high, mounting interference will be caused, so that the electrode terminal 200 presses the first protrusion 600 and the second protrusion 700 during mounting, resulting in a failure in mounting in place. If the first protrusion 600 and the second protrusion 700 are too low, the sealing member 300 and the plastic member 400 may not be effectively isolated, and the sealing member 300 cannot be effectively limited.

Therefore, along an axial direction of the electrode terminal 200, a size of the first protrusion 600 is H1, and a size of the second protrusion 700 is H2. It can be set that 0.1 mm<H1<0.3 mm, for example, H1=0.11 mm, 0.2 mm and 0.28 mm; and that 0.1 mm<H2<0.3 mm, for example, H2=0.11 mm, 0.2 mm and 0.28 mm.

In this way, the first protrusion 600 and the second protrusion 700 can ensure that the sealing member 300 from the plastic member 400 are effectively isolated and that the sealing member 300 is effectively positioned while the mounting interference is avoided.

Optionally, the sealing member 300 may further include a second sealing portion 320. The second sealing portion 320 and the first sealing portion 310 are integrated to ensure the structural stability. The second sealing portion 320 abuts against an inner surface of the outlet hole 110.

As mentioned above, sealing between the end cover 100 and the electrode terminal 200 can be achieved by using the first sealing portion 310. The second sealing portion 320 and the outlet hole 110 cooperate with each other, which can limit the sealing member 300 in the radial direction of the electrode terminal 200 and prevent the abnormal movement of the first sealing portion 310 towards the plastic member 400, thereby improving position stability of the sealing member 300 and more effectively preventing contact between the sealing member 300 and the plastic member 400.

Meanwhile, based on the arrangement of the second sealing portion 320, a region located between the outlet hole 110 and the connection sheet 800 can also be sealed. Specifically, the connection sheet 800 is provided with a convex portion. The convex portion is arranged at the outlet hole 110 to be electrically connected to the electrode terminal 200. The second sealing portion 320 is located between a surface of the outlet hole 110 and a peripheral surface of the connection sheet 800.

The connection sheet 800 is usually arranged on one side of the outlet hole 110 that faces a housing of the energy storage device, so as to be electrically connected to a cell in the housing, thereby realizing electrical conduction of the energy storage device. The second sealing portion 320 is arranged between the connection sheet 800 and the outlet hole 110, which can prevent seepage of electrolyte in the housing towards one side of the outlet hole 110 and further improve the sealing property.

Optionally, along the thickness direction of the end cover 100, one end of the second sealing portion 320 away from the first sealing portion 310 can be located out of the outlet hole 110. An exiting direction of the second sealing portion 320 is along an axial direction of the outlet hole 110. It can be seen that the second sealing portion 320 extends out of the outlet hole 110, so that the second sealing portion 320 can completely cover the outlet hole 110. In this way, the second sealing portion 320 can more effectively prevent the convex portion of the connection sheet 800 from being in contact with the outlet hole 110, so as to avoid abnormal phenomena such as a short circuit.

Optionally, the plastic member 400 further includes a second plastic portion 420. The second plastic portion 420 and the first plastic portion 410 are integrated. The second plastic portion 420 surrounds a peripheral surface of the electrode terminal 200.

As mentioned above, the first plastic portion 410 can realize injection connection between the end cover 100 and the electrode terminal 200. The second plastic portion 420 can cooperate with the electrode terminal 200 to limit the plastic member 400 in the radial direction of the electrode terminal 200 and prevent a transverse movement of the plastic member 400, which more effectively ensures the position stability of the second gap 500. At the same time, the arrangement of the second plastic portion 420 can also make the connection between the plastic member 400 and the electrode terminal 200 more stable.

Optionally, a concave portion 120 can be formed in a surface of one side of the end cover 100 that faces the electrode terminal 200, and the outlet hole 110 is formed in a bottom of the concave portion 120. Projections, on the end cover 100, of the electrode terminal 200 and the plastic member 400 along the thickness direction of the end cover 100 are located in the concave portion 120, so that the first gap is formed between the electrode terminal 200 and the bottom of the concave portion 120.

It can be seen that this structural design of the concave portion 120 can receive the electrode terminal 200 and the plastic member 400, and limit, in the radial direction of the electrode terminal 200, a whole formed by the electrode terminal 200 and the plastic member 400, thereby ensuring that the overall structure is more stable and better preventing the sealing member 300 from being in contact with the plastic member 400.

Optionally, in the thickness direction of the end cover 100, a ratio of a thickness H3 of the first gap to a depth H4 of the concave portion 120 is $0.5 \leq H3/H4 \leq 0.8$, for example, H3/H4=0.51, 0.7 and 0.78.

If the ratio of H3/H4 is too small, the first gap is thinner than the concave portion 120, and it is difficult for the sealing member 300 and the plastic member 400 to extend into the first gap, which will reduce the sealing property and injection connection stability between the end cover 100 and the electrode terminal 200. If the ratio of H3/H4 is too large, the concave portion 120 is thinner than the first gap, and the concave portion 120 cannot achieve a better receiving effect on the electrode terminal 200 and the plastic member 400.

Therefore, H3/H4 is set to be within the above range to ensure the receiving effect on the electrode terminal 200 and the plastic member 400, and ensure the sealing and injection connection effect between the end cover 100 and the electrode terminal 200.

Optionally, the sealing member 300 is of an independent structure, and the sealing member 300 is mounted on the end cover 100. Since the sealing member 300 is set to be of the independent structure, it can be convenient to mount the sealing member 300 on the end cover 100, or the sealing members 300 with different sizes can be adapted according to the plastic member 400 to avoid the contact between the plastic member 400 and the sealing member 300.

The present disclosure further discloses an energy storage device, including a housing, an electrode assembly and an end cover assembly. One end of the housing has an opening. The electrode assembly is accommodated in the housing. The end cover assembly hermetically covers the opening of the housing. The energy storage device may be a battery cell, a battery pack, and the like.

Optionally, the energy storage device may further include a connection sheet 800. The connection sheet 800 is used for electrically connecting the electrode terminal 200 with the electrode assembly. The connection sheet 800 is accommodated in the housing. The connection sheet 800 is provided with a convex portion. The convex portion passes through the outlet hole 110 and is electrically connected with the electrode terminal 200, thereby realizing transmission of electric energy in the energy storage device.

The present disclosure further discloses electrical equipment, including an energy storage device. The electrical equipment may be an electric automobile, which will not be described in detail here again.

It should be finally noted that the above various embodiments are only used to describe the technical solutions of the present disclosure, and not intended to limit the present disclosure. Although the present disclosure has been described in detail with reference to the foregoing embodiments, those ordinarily skilled in the art should understand that they can still modify the technical solutions described in all the foregoing embodiments, or equivalently replace some or all of the technical features, and these modifications or replacements do not depart the essences of the corresponding technical solutions from the spirit and scope of the technical solutions of all the embodiments of the present disclosure.

What is claimed is:

1. An end cover assembly comprising:
   an end cover provided with an through outlet hole penetrating therethrough;
   an electrode terminal arranged on one side of the end cover, wherein a projection, on the end cover, of the electrode terminal along a thickness direction of the end cover covers the outlet hole, and wherein a first gap surrounding the outlet hole is formed between the electrode terminal and the end cover;
   a sealing member comprising a first sealing portion, wherein the first sealing portion fills one side of the first gap close to the outlet hole;
   a plastic member comprising a first plastic portion, wherein the first plastic portion fills one side of the first gap away from the outlet hole; and
   a second gap formed between the first sealing portion and the first plastic portion,
   wherein:
   an edge of one side of the first gap close to the outlet hole is provided with a first protrusion, and the first protrusion is connected to the end cover;
   a second protrusion is arranged in the second gap, and the second protrusion is connected to the end cover and/or the electrode terminal;
   the first sealing portion is located between the first protrusion and the second protrusion;
   along a radial direction of the electrode terminal, a size of the first gap is D1, and a size of the second gap is D2, $0.2 \leq D2/D1 \leq 0.0.3$, 1.1 mm<D2<1.3 mm; and
   along an axial direction of the electrode terminal, a size of the first protrusion is H1, and a size of the second protrusion is H2, wherein 0.1 mm<H1<0.3 mm, and 0.1 mm<H2<0.3 mm.

2. The end cover assembly according to claim 1, wherein:
   the sealing member further comprises a second sealing portion;
   the second sealing portion and the first sealing portion are integrated; and
   the second sealing portion abuts against an inner surface of the outlet hole.

3. The end cover assembly according to claim 2, wherein along the thickness direction of the end cover, one end of the second sealing portion away from the first sealing portion is located out of the outlet hole.

4. The end cover assembly according to claim 1, wherein:
   the plastic member further comprises a second plastic portion;
   the second plastic portion and the first plastic portion are integrated; and
   the second plastic portion surrounds a peripheral surface of the electrode terminal.

5. The end cover assembly according to claim 4, wherein:
a concave portion is formed in a surface of one side of the end cover that faces the electrode terminal, and the outlet hole is formed in a bottom of the concave portion; and
projections, on the end cover, of the electrode terminal and the plastic member along the thickness direction of the end cover are located in the concave portion, so that the first gap is reserved between the electrode terminal and the bottom of the concave portion.

6. The end cover assembly according to claim 5, wherein in the thickness direction of the end cover, a ratio of a thickness H3 of the first gap to a depth H4 of the concave portion is:

$$0.5 \leq H3/H4 \leq 0.8.$$

7. The end cover assembly according to claim 1, wherein the sealing member is of an independent structure, and the sealing member is mounted on the end cover.

8. An energy storage device comprising:
a housing having an opening at one end thereof;
an electrode assembly accommodated in the housing; and
the end cover assembly according to claim 1, wherein the end cover assembly hermetically covers the opening of the housing.

9. The energy storage device according to claim 8, further comprising a connection sheet,
wherein:
the connection sheet is configured to electrically connect the electrode terminal with the electrode assembly;
the connection sheet is accommodated in the housing; and
the connection sheet is provided with a convex portion;
the convex portion passes through the outlet hole and is electrically connected with the electrode terminal.

10. Electrical equipment comprising the energy storage device according to claim 8.

* * * * *